(12) United States Patent
Guha et al.

(10) Patent No.: US 11,118,815 B2
(45) Date of Patent: Sep. 14, 2021

(54) HYBRID SOLAR THERMAL AND PHOTOVOLTAIC ENERGY COLLECTION

(71) Applicant: International Business Machines Corporation, Armonk, NY (US)

(72) Inventors: Supratik Guha, Chicago, IL (US); Siyuan Lu, Yorktown Heights, NY (US); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 16/459,114

(22) Filed: Jul. 1, 2019

(65) Prior Publication Data

US 2019/0323734 A1   Oct. 24, 2019

Related U.S. Application Data

(62) Division of application No. 15/268,213, filed on Sep. 16, 2016, now Pat. No. 10,378,792.

(51) Int. Cl.
*F24S 60/30* (2018.01)
*H02S 40/44* (2014.01)
(Continued)

(52) U.S. Cl.
CPC ............... *F24S 60/30* (2018.05); *F24S 10/45* (2018.05); *F24S 23/74* (2018.05); *F24S 23/82* (2018.05);
(Continued)

(58) Field of Classification Search
CPC .......... H02S 20/32; H02S 40/44; F24S 10/45; F24S 30/452; F24S 60/30; F24S 23/82; F24S 23/74; F24S 50/20
See application file for complete search history.

(56) References Cited

U.S. PATENT DOCUMENTS 3,351,120 A   11/1967   Goeldner et al.
3,941,663 A    3/1976   Steinbruchel
(Continued)

FOREIGN PATENT DOCUMENTS

EP   1564816 A1    8/2005
JP   2013096676 A  5/2013
(Continued)

OTHER PUBLICATIONS

English Translation of JP2013179138A by Kitamura Kiminao et al., Sep. 9, 2013 (10 pages).
(Continued)

*Primary Examiner* — Matthew T Martin
(74) *Attorney, Agent, or Firm* — Jeffrey S LaBaw; Michael J. Chang, LLC

(57) ABSTRACT

Techniques for hybrid solar thermal and photovoltaic energy collection are provided. In one aspect, a photovoltaic concentrating thermal collector (PVCTC) includes: a thermal absorber collector; and bent solar panels forming a parabolic shaped trough reflector partially surrounding the thermal absorber collector so as to reflect incident light onto the thermal absorber collector. A PVCTC system including an array of PVCTC units and a method for hybrid electrical and thermal energy production are also provided.

20 Claims, 6 Drawing Sheets

(51) Int. Cl.
  *F24S 10/40* (2018.01)
  *F24S 23/70* (2018.01)
  *F24S 50/20* (2018.01)
  *F24S 23/74* (2018.01)
  *F24S 30/452* (2018.01)
(52) U.S. Cl.
  CPC ............ *F24S 30/452* (2018.05); *F24S 50/20* (2018.05); *H02S 40/44* (2014.12); *F24S 2023/86* (2018.05); *Y02E 10/40* (2013.01); *Y02E 10/44* (2013.01); *Y02E 10/47* (2013.01)

(56) References Cited

U.S. PATENT DOCUMENTS

| | | | |
|---|---|---|---|
| 4,210,121 | A | 7/1980 | Stark |
| 4,212,593 | A | 7/1980 | Chadwick |
| 4,497,689 | A | 2/1985 | Szucs et al. |
| 5,139,620 | A | 8/1992 | Elmore et al. |
| 6,804,962 | B1 | 10/2004 | Prueitt |
| 8,043,499 | B2 | 10/2011 | Saeed et al. |
| 8,277,614 | B2 | 10/2012 | Alhazmy |
| 9,278,315 | B2 | 3/2016 | Davis et al. |
| 9,393,502 | B1 | 7/2016 | Zeitoun et al. |
| 9,539,522 | B1 | 1/2017 | El-Sayed |
| 9,834,455 | B2 | 12/2017 | Frolov et al. |
| 2010/0051015 | A1 | 3/2010 | Ammar |
| 2010/0051018 | A1 | 3/2010 | Ammar et al. |
| 2010/0154866 | A1 | 6/2010 | Khan |
| 2010/0300510 | A1* | 12/2010 | Goldman ................ F24S 23/77 136/246 |
| 2011/0005580 | A1* | 1/2011 | Vandermeulen ........ F24S 20/40 136/251 |
| 2011/0198208 | A1 | 8/2011 | Olwig et al. |
| 2013/0168224 | A1 | 7/2013 | Godshall |
| 2013/0306139 | A1* | 11/2013 | Bostwick ................ F24S 23/79 136/248 |
| 2014/0021031 | A1 | 1/2014 | Koivusaari et al. |
| 2014/0290247 | A1 | 10/2014 | Mishima et al. |
| 2015/0083194 | A1 | 3/2015 | Matsushima |
| 2015/0143806 | A1 | 5/2015 | Friesth |
| 2015/0197150 | A1* | 7/2015 | Shirai .................... H02S 30/10 180/2.2 |
| 2016/0380583 | A1 | 12/2016 | Banerjee |
| 2017/0275182 | A1 | 9/2017 | Alshahrani |

FOREIGN PATENT DOCUMENTS

| | | | | |
|---|---|---|---|---|
| JP | 2013179138 A | 9/2013 | | |
| KR | 20140124967 A | 10/2014 | | |
| WO | WO-2015117134 A1 * | 8/2015 | ..... H01L 31/035281 |
| WO | WO2015117134 A1 | 8/2015 | | |

OTHER PUBLICATIONS

English Translation of JP2013096676A by Eguchi Tatsuya et al., May 20, 2013 (12 pages).
English Translation of KR20140124967A by Im In Ho, Oct. 28, 2014 (8 pages).
List of IBM Patents or Applications Treated as Related (2 pages).

* cited by examiner

| solar panel coating | thermal power (W) | Panel PV power (W) | total power (W) | % thermal power |
|---|---|---|---|---|
| conventional | 123.81 | 194.40 | 318.21 | 38.91% |
| TiO$_2$ coated | 236.25 | 151.88 | 388.13 | 60.87% |

HYBRID SOLAR THERMAL AND PHOTOVOLTAIC ENERGY COLLECTION

CROSS-REFERENCE TO RELATED APPLICATION(S)

This application is a divisional of U.S. application Ser. No. 15/268,213 filed on Sep. 16, 2016, now U.S. Pat. No. 10,378,792, the disclosure of which is incorporated by reference herein.

FIELD OF THE INVENTION

The present invention relates to photovoltaics, and more particularly, to techniques for hybrid solar thermal and photovoltaic energy collection.

BACKGROUND OF THE INVENTION

Solar photovoltaic generation has demonstrated cost effective power production that is now comparable to grid costs. Solar thermal collectors demonstrate high efficiency with regard to producing high grade heat that is useful directly for heating, cooling via absorption chillers, and storage. Applications include both residential and industrial scale systems.

However, large scale adoption of solar energy is limited in part by the ability to store the energy. Therefore, techniques for generating, using, and storing both electricity and thermal energy in a single system would be desirable.

SUMMARY OF THE INVENTION

The present invention provides techniques for hybrid solar thermal and photovoltaic energy collection. In one aspect of the invention, a photovoltaic concentrating thermal collector (PVCTC) is provided. The PVCTC includes: a thermal absorber collector; and bent solar panels forming a parabolic shaped trough reflector partially surrounding the thermal absorber collector so as to reflect incident light onto the thermal absorber collector.

In another aspect of the invention, a PVCTC system is provided. The PVCTC system includes: an array of PVCTC units, wherein each of the PVCTC units has a thermal absorber collector; and bent solar panels forming a parabolic shaped trough reflector partially surrounding the thermal absorber collector so as to reflect incident light onto the thermal absorber collector.

In yet another aspect of the invention, a method for hybrid electrical and thermal energy production is provided. The method includes: providing a PVCTC system having at least one PVCTC unit which has a thermal absorber collector, a cooling fluid within the thermal absorber collector, and bent solar panels forming a parabolic shaped trough reflector partially surrounding the thermal absorber collector; absorbing a portion of incident light on the bent solar panels to generate electrical energy; and reflecting a portion of the incident light from the parabolic shaped trough reflector onto the thermal absorber collector to heat the cooling fluid within the thermal absorber collector thereby generating thermal energy.

A more complete understanding of the present invention, as well as further features and advantages of the present invention, will be obtained by reference to the following detailed description and drawings.

DETAILED DESCRIPTION OF PREFERRED EMBODIMENTS

There is an emerging desire to have a mechanism to generate both electricity and thermal energy in a single system to both produce electricity and high grade heat for immediate use in heating, cooling and power generation and deferred use in the form of thermal energy storage for later power generation. Advantageously, provided herein is a hybrid electric and thermal solar energy collection system that uses cost-optimized crystalline silicon or other thin film photovoltaic panels themselves as simultaneous reflectors/spectral filters to concentrate first surface and (dominantly) sub-band gap reflected solar light to about 15× optical concentration (including defocus) on evacuated thermal absorber collectors to produce both photovoltaic electricity and high-grade heat. This hybrid electric and thermal solar energy collection system will also be referred to herein as a PhotoVoltaic Concentrating Thermal Collector (or PVCTC). The term "photovoltaic," as used herein, refers to photovoltaic panels including, but not limited to, crystalline silicon solar panels. As will be described in detail below, the panels are curved/bent so as to focus light on a thermal absorber collector. Any thermal absorber collector with suitable geometry can be used. An evacuated absorber (see below) is preferred for efficiency and the fact that low cost elements are available in the market place. However, simple thermal absorber heat exchangers may also be used.

Figure 1:
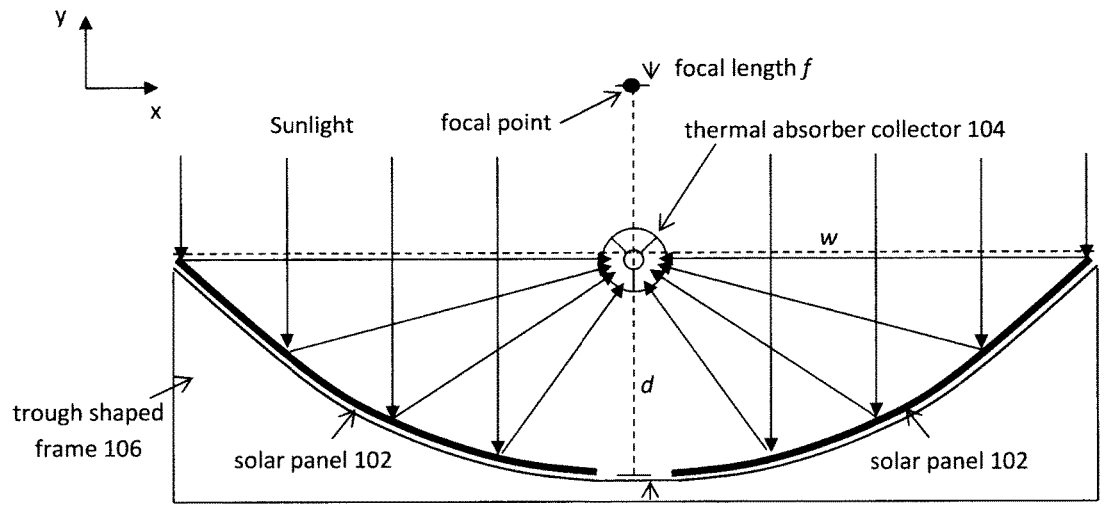
FIG. 1 is a diagram illustrating a side view of the present PhotoVoltaic Concentrating Thermal Collector (PVCTC) which includes multiple bent solar panels arranged so as to focus light on a thermal absorber collector according to an embodiment of the present invention.

An overview of the present PVCTC system design is now provided by way of reference to FIG. 1. As shown in FIG. 1, the PVCTC system includes multiple bent solar panels 102 that are arranged partially surrounding a thermal absorber collector 104 so as to focus sunlight (reflected off of the bent panels) onto the thermal absorber collector 104. In one exemplary embodiment, the thermal absorber collector 104 is an evacuated thermal absorber. However, as noted above, a simple thermal absorber heat exchanger may also be used in accordance with the present techniques. According to an exemplary embodiment, the bend in the panels is achieved by mounting the panels to a shaped frame as shown in FIG. 1. Further, as will be described in detail below, the entire system (e.g., via the shaped frame) is preferably mounted to a solar tracking system configured to point the panels normal to the sun.

Incident light from the sun is partially absorbed and (as shown in FIG. 1) partially reflected from the solar panels 102. Solar panels 102 are slightly bent from their normal flat geometry to form a parabolic surface in one axis (for example, along the x-axis in FIG. 1) forming a trough reflector. According to an exemplary embodiment, the trough reflector design is achieved by mounting the solar panels 102 (using, e.g., a suitable adhesive, mechanical fasteners, etc.) to a (trough) shaped frame 106. See FIG. 1.

According to an exemplary embodiment, the trough reflector has a width w of from about 1 meter to about 1.5 meters and ranges therebetween, and a depth d of from about 10 centimeters to about 15 centimeters and ranges therebetween. This provides a focal length f of about 0.75 meters. Placing the thermal absorber collector 104 between the trough reflector and the focal point puts the thermal absorber collector 104 at a slighted defocused position to spread the radiation and tolerate tracking inaccuracy. With this exemplary configuration, approximately 15× concentration of solar specular radiation (direct and circumsolar of +5 degrees) is expected. It is notable that a flat solar panel can withstand the strain imparted by being bent in this manner without impacting its performance. For instance, in the present example the bending radius is about 185 centimeters which creates a strain in the solar panels of about 1×10 which does not impact the performance of the panels.

The sunlight absorbed by the solar panels 102 is utilized for solar power production. Thus, the present PVCTC design generates both electricity and thermal energy in a single system to both produce electricity and high grade heat. As will be described in detail below, the heat generated by the system can be employed for immediate use in heating, cooling and power generation and deferred use in the form of thermal energy storage for later power generation.

Figure 2:
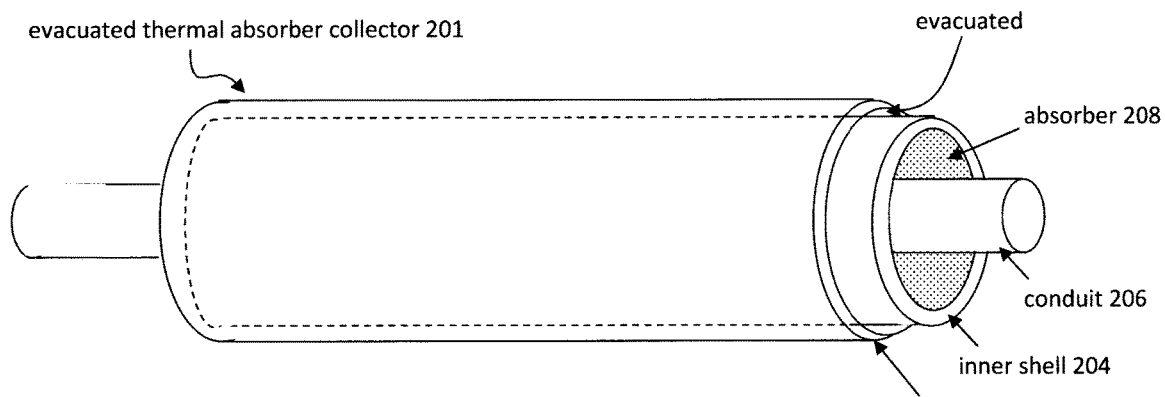
FIG. 2 is a diagram illustrating an exemplary evacuated thermal absorber collector according to an embodiment of the present invention.
Figure 2A:
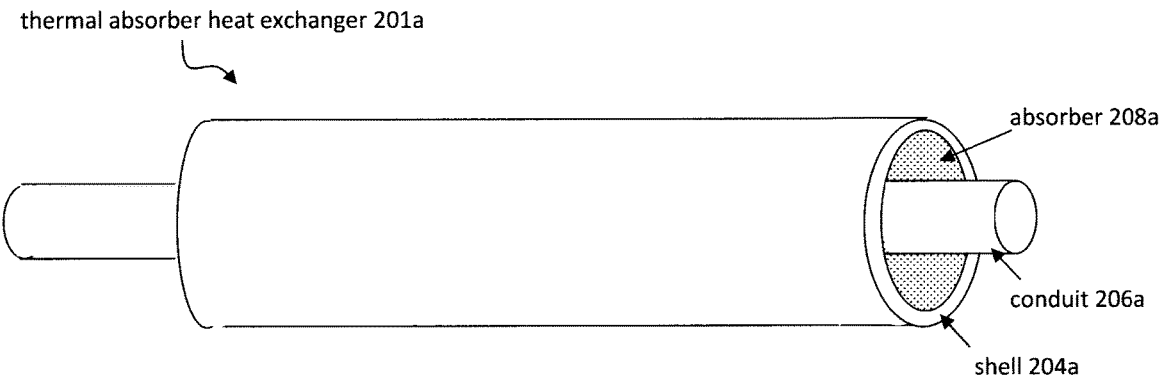
FIG. 2A is a diagram illustrating an thermal absorber heat exchanger according to an embodiment of the present invention.

An exemplary evacuated thermal absorber collector 201 is shown in FIG. 2. Evacuated thermal absorber collector 201 can serve as the thermal absorber collector 104 in the present PVCTC design. As shown in FIG. 2, evacuated thermal absorber collector 201 includes a tube having an outer shell 202 and an inner shell 204. According to an exemplary embodiment, the outer shell 202 and the inner shell 204 are glass. By 'evacuated' it is meant that a vacuum is created between the outer shell 202 and the inner shell 204. See FIG. 2. The inner surface of the inner shell 204 is coated with a heat absorbing layer 208. The tube surrounds a conduit 206 at its core. By way of example only, the conduit 206 can be a heat pipe or a simple conduit through which a cooling fluid (see below) is pumped.

The evacuated thermal absorber collector 201 operates by the general principle that light can enter the evacuated thermal absorber collector 201 due to the outer shell 202 and the inner shell 204 being transparent (i.e., formed from transparent glass). The light is absorbed by the absorber layer 208, generating heat. The heat generated cannot escape the tube due to the vacuum between the outer shell 202 and the inner shell 204.

When the conduit 206 is simply a means for passing the cooling fluid through the evacuated thermal absorber collector 201, then heat is transferred from the absorber 208 to the fluid as it passes through the conduit 206. When the conduit 206 is a heat pipe, heat from the absorber 208 is transferred to a working fluid within the heat pipe. This causes the working fluid in the heat pipe to evaporate, transferring the heat to the cooling fluid. See, for example, FIG. 3. At the cooler regions of the heat pipe, the working fluid will re-condense and flow back to the core of the evacuated thermal absorber collector 201. See FIG. 3.

Alternatively, the thermal absorber collector 104 is a thermal absorber heat exchanger 201a which, like the evacuated thermal absorber collector 201 (of FIG. 2), includes a tube having a (e.g., glass) shell 204a, and a heat absorbing layer 208a coated on an inner surface of shell 204a. Thermal absorber heat exchanger 201a, however, lacks the evacuated shell. While this alternate design is less efficient, it provides a lower cost solution. The tube surrounds a conduit 206a (e.g., a heat pipe or a simple conduit through which a cooling fluid is pumped) at its core.

In the same manner as described above, light enters thermal absorber heat exchanger 201a due to shell 204a being transparent (i.e., formed from transparent glass). The light is absorbed by the absorber layer 208a, generating heat. The heat is transferred from the absorber layer 208a to the fluid as it passes through the conduit 206a. As described above, when the conduit 206a is a heat pipe, heat from the absorber layer 208a is transferred to a working fluid within the heat pipe.

Figure 4:
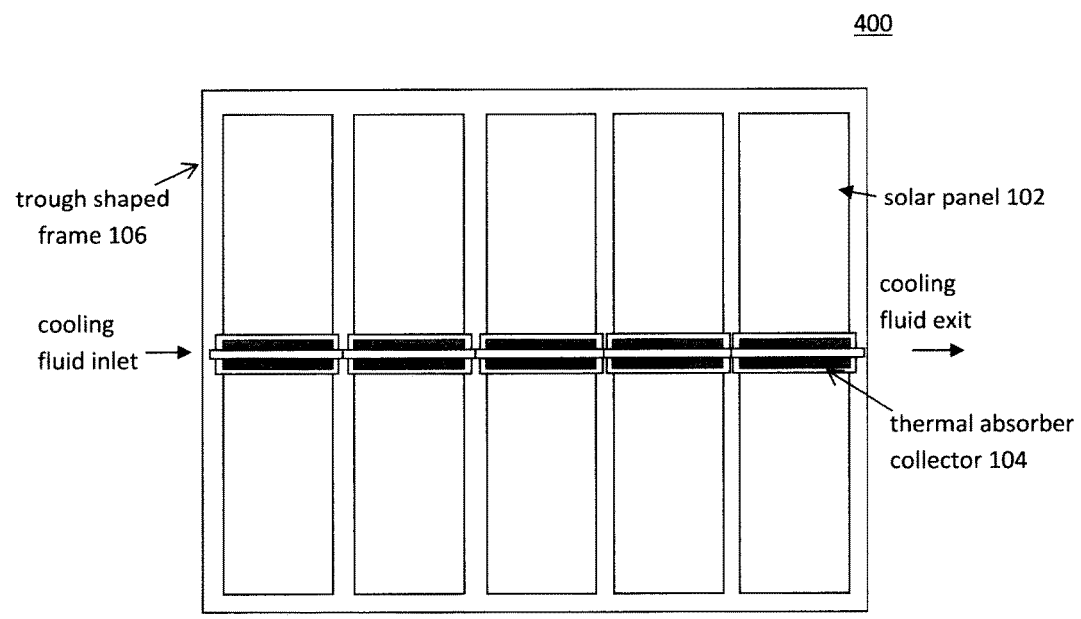
FIG. 4 is a diagram illustrating a top view of an array of the present PVCTC units according to an embodiment of the present invention.

A top view of the present PVCTC system is shown in FIG. 4. In the exemplary configuration 400 shown in FIG. 4, multiple parabolically-bent solar panels 102 (see above) are arranged in an array that concentrates reflected sunlight on the thermal absorber collectors 104 near the focus. It is notable that while FIG. 4 shows the PVCTC design implemented as an array, the present techniques are applicable to systems employing only a single PVCTC unit having, e.g., two parabolically-bent solar panels 102 as is shown in FIG. 1.

In this exemplary configuration, each thermal absorber collector 104 is centrally located to receive light from two parabolically-bent solar panels 102. The entire array is supported by the trough-shaped frame 106 (as described above) and is preferably placed on a solar tracking system (see below) to point the array normal to the sun.

Figure 3:
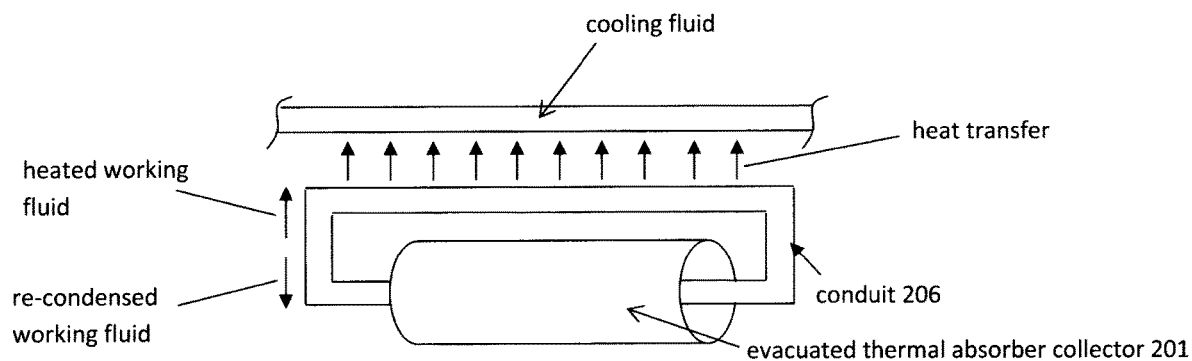
FIG. 3 is a diagram illustrating operation of a heat pipe-based evacuated thermal absorber collector according to an embodiment of the present invention.

During operation, a cooling fluid is circulated through the thermal absorber collector 104 to remove the heat absorbed therein. Suitable cooling fluids include, but are not limited to, water, oil, polyethylene glycol, KRYTOX™ oil (available from E. I. du Pont de Nemours and Company, Wilmington, Del.), and/or Perfluoropolyether (PFPE) oil. The choice of a particular cooling fluid largely depends on the desired maximum temperature of the fluid (for example oils can accommodate higher temperatures (e.g., above 100° C.) than water (e.g., below 100° C.) without system pressurization). This maximum cooling fluid temperature can be regulated by throttling the flow through the thermal absorber collector 104 and will be determined by system requirements. It is understood the fluid may additionally contain lesser constituents including rust inhibitors, anti freezing, and anti microbial compounds such as alcohols. In general, the cooling fluid entering the system (at the cooling fluid inlet) will be at a lower temperature than the cooling fluid leaving the system (at the cooling fluid exit). It is notable that the scenario of a cooling fluid flowing directly through the thermal absorber collector 104 is depicted in this example. However, a heat pipe-based design can also be employed (as shown in FIG. 3) where the cooling fluid passes in close proximity (to enable heat transfer) to the working fluid in the heat pipe.

Figure 5:
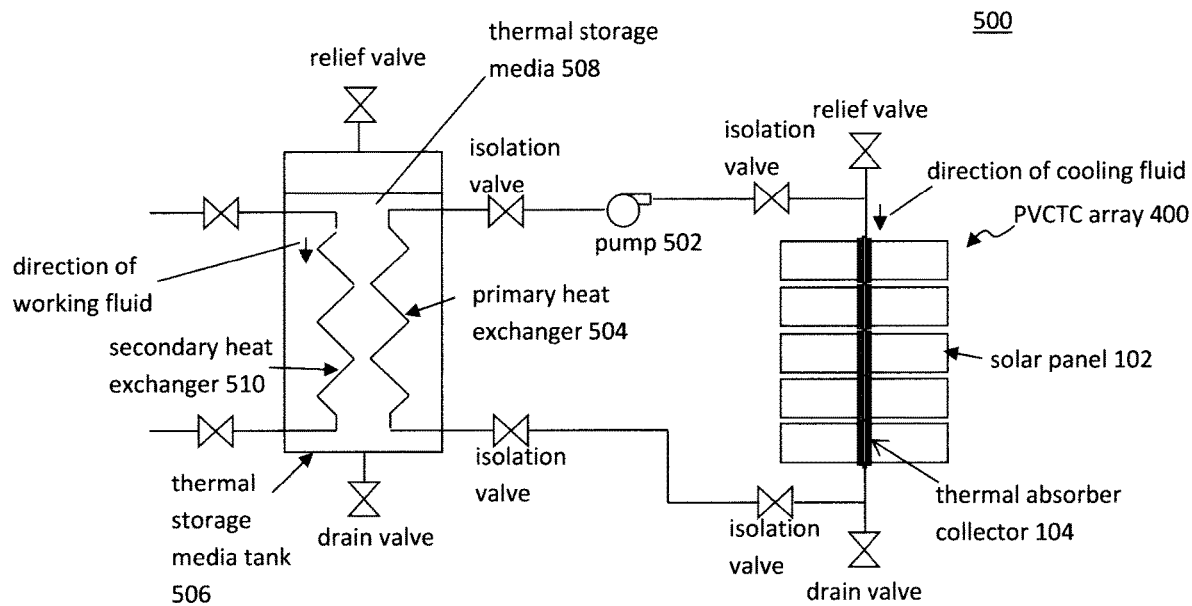
FIG. 5 is a schematic diagram illustrating an exemplary fluid thermal storage system including the present PVCTC according to an embodiment of the present invention.

One exemplary implementation of the present PVCTC design is in a thermal fluid circulation and storage system 500. See FIG. 5. As shown in FIG. 5, a cooling fluid is pumped through the PVCTC array 400 (of FIG. 4) using a fluid pump 502. While passing through the PVCTC array 400, the cooling fluid is heated by absorbed solar thermal energy (via the above-described parabolically-bent solar panels 102 and thermal absorber collector 104) which is then conveyed to primary heat exchanger 504. As shown in FIG. 5, a primary heat exchanger 504 is located in a thermal storage media tank 506. The primary heat exchanger 504 is fluidly connected (in a loop) to the thermal absorber collector 104. Thus, fluid passing through the PVCTC array 400 is heated and, by action of the fluid pump 502, is circulated through the primary heat exchanger 504. The primary heat exchanger 504 is in a thermal storage media 508 (the primary heat exchanger 504 is in contact with the thermal storage media 508) that is present in a tank 506 and, as will be described below, heat from the cooling fluid is transferred (by the primary heat exchanger 504) to the thermal storage media 508. A secondary heat exchanger 510 containing a working fluid and also in the thermal storage media 508, absorbs the heat from the thermal storage media 508. The (now cooled) fluid is circulated from the primary heat exchanger 504 (via action of the fluid pump 502) back through the thermal absorber collectors 104 of the PVCTC array 400.

The thermal storage media tank 506 contains a thermal storage media 508 which is heated by the circulating working fluid in the primary heat exchanger 504. Thermal energy can be removed from the thermal storage media 508 by circulating a working fluid through a secondary heat exchanger 510, also present in the thermal storage media tank 506. See FIG. 5. The (now heated) working fluid can be used for a variety of different applications, such as directly for heating, cooling via absorption chillers, etc. For instance, the present PVCTC system can be coupled with a solar-thermal water purification system as described in U.S. patent application Ser. No. 15/268,194, entitled "Solar-Thermal Water Purification by Recycling Photovoltaic Reflection Losses," the contents of which are incorporated by reference as if fully set forth herein.

As shown in FIG. 5, the system can include a variety of valves to control flow of the various fluids. For instance, isolation valves can be employed to isolate the cooling/working fluids to various different segments of the system. By way of example only, the isolation valves can regulate the flow of the cooling fluid through the PVCTC array, i.e., the slower the rate of flow through the PVCTC array the higher the amount of heating the cooling fluid receives, and vice versa. Relief valves control the pressure within the system, and drain valves allow cooling fluid and/or thermal storage media to be purged from the system. The valves can be controlled manually and/or means can be provided for automatically controlling the valves, for example, via a computer-regulated system.

Using conventional 15% efficient tracked crystal silicon flat panel solar generators as the baseline, the present PVCTC system is conservatively estimated to generate at least 82 watts per square meter (W/m$^2$) of thermal power (~38% of total energy produced by the system) in addition to electricity with small (~10%) additional equipment costs. Thus, the gains in terms of power production are significant. However, according to an exemplary embodiment, the thermal energy harvesting and thermal-to-total energy ratio are improved by coating the solar panels 102 with an optical coating/glaze to increase the first surface reflection. Suitable optical coatings include, but are not limited to, magnesium fluoride ($MgF_2$), zinc sulfide (ZnS), silicon dioxide ($SiO_2$) and/or titanium oxide ($TiO_2$).

By way of example only, a $TiO_2$ glaze increases the first surface reflection to approximately 25%. The result is an increase in total power to about 258 W/m$^2$, with thermal power making up about 60% of the total energy produced by the system. Further improvements might be realized by modifying the surface texturing of PV cells (e.g., by roughening the solar cell surfaces to reflect more sub band gap radiation) and/or adapting PV cells based on lift-off substrates when they become economical.

Figure 6:
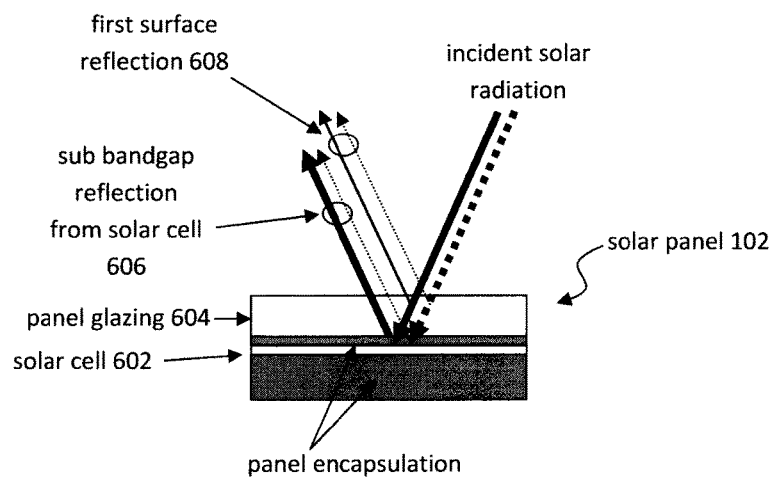
FIG. 6 is a diagram illustrating the reflected light components from a photovoltaic panel according to an embodiment of the present invention.

Reference is made above to first surface and sub-band gap components of reflected sun light from the solar panels 102 in the present PVCTC system. See FIG. 6 which illustrates schematically how these two components of incident solar specular radiation are concentrated by the parabolically-shaped solar panels 102. As shown in FIG. 6, the individual solar cells 602 that make up the panel 102 are encapsulated, and an (optional) panel glazing 604 is present on the panel. As provided above, panel glazing (e.g., with $TiO_2$) increases the first surface reflection.

Reflection 606 of the sub band gap wavelengths component from the solar cell and reflection 608 of all wavelengths from the panel glazing makes up about 4% of the incident specular radiation. Silicon solar panels, for instance, are optimized to capture light in the visible portion of the solar radiation with photon energies above the band gap of silicon (or other photovoltaic material). Below the band gap energy, a significant amount is both scattered (~50%) and reflected. The specular reflection for sub band gap wavelengths is about 15% (and about 5% for above gap wavelengths). Applying this reflectance to an air mass 1.5 (AM1.5) solar spectrum at 900 W/m$^2$ predicts approximately 85 W/m$^2$ of reflected solar energy. This combined with about 36 W/m$^2$ (4%) reflection gives a total 121 W/m$^2$, which results in about 85 W/m$^2$ of thermal power generation even if a conservative 70% transfer efficiency for the evacuated thermal collector is assumed.

The use of, e.g., $TiO_2$, panel glazing slightly reduces the photovoltaic component while significantly increasing the thermal component of the system to approximately 60%. See, for example, FIG. 7 which compares conventional versus $TiO_2$ coated single 15% crystal silicon solar panel (~1.5 m$^2$) for thermal energy generation using evacuated thermal absorber collectors.

Figures 7, 8A:
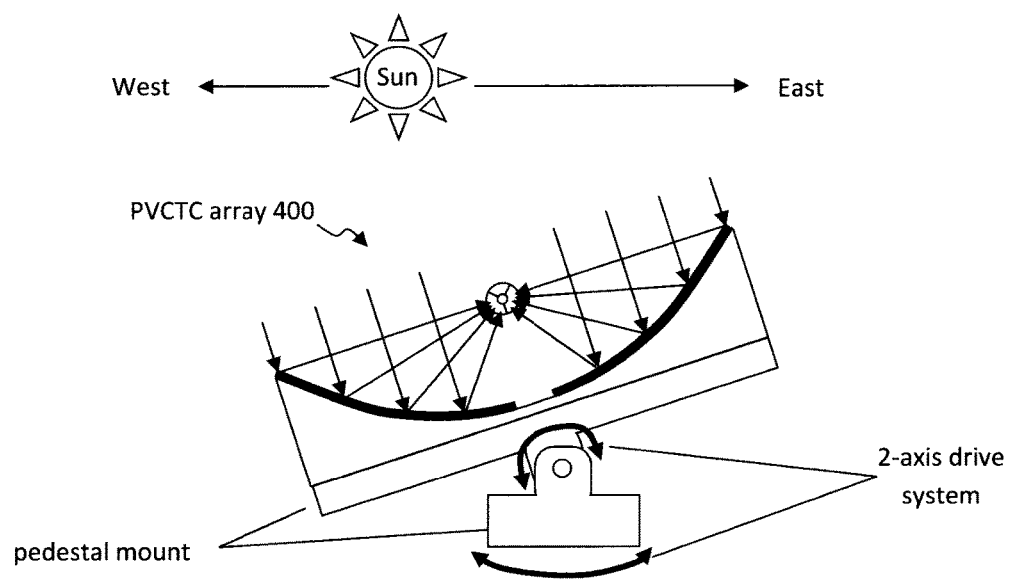
FIG. 7 is a diagram comparing thermal and photovoltaic power in conventional and $TiO_2$ coated solar panels for thermal energy generation according to an embodiment of the present invention.
FIG. 8A is a diagram illustrating solar tracking when the sun is located in the western part of the sky according to an embodiment of the present invention.

As shown in FIG. 7, the $TiO_2$ coated panel increases the thermal to electric (photovoltaic or PV) power ratio to approximately 60. The aforementioned thermal energy flux and concentration factor (123 watts (W) to 236 W and 15×) are sufficient to generate collection temperatures in the range of 150° C. and above (tunable with thermal fluid flow rate). It is notable that alternate optical coatings of the panel may be employed to alter the ratio as desired in the 40% to 60% range. These coatings include, but are not limited to, magnesium fluoride, zinc sulfide, silicon dioxide and/or titanium oxide. The coatings are tailored by design to optimize the reflected light therefrom.

The present PVCTC system shares substantial features with conventional tracked flat panel technology. Similar field lifetime (25 years) and large scale applicability (>1000 m$^2$) is expected. Approximately 10% of additional collector cost is to be invoked. The cost-optimized silicon solar cells serve the dual purpose of photovoltaic device as well as concentrator/wavelength filter.

As provided above, the PVCTC system preferably includes a solar tracking system configured to point the bent solar panels normal to the sun. See, for example, FIGS. 8A-C which illustrate solar tracking when the sun is in the western, centrally located, and eastern part of the sky, respectively.

Figure 8B:
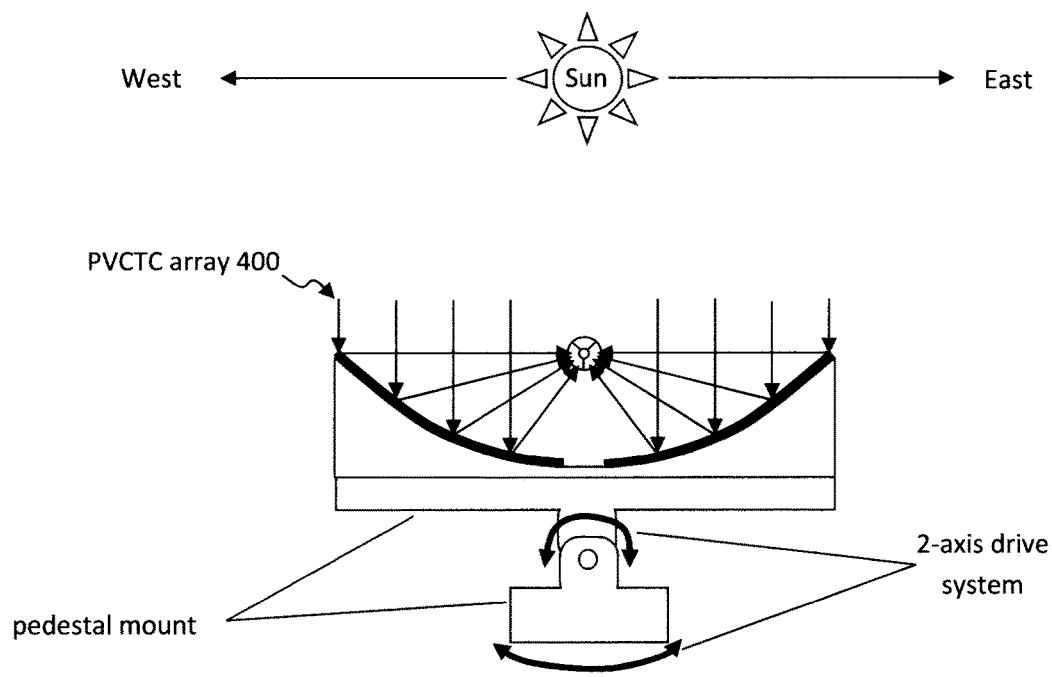
FIG. 8B is a diagram illustrating solar tracking when the sun is located centrally overhead according to an embodiment of the present invention.
Figure 8C:
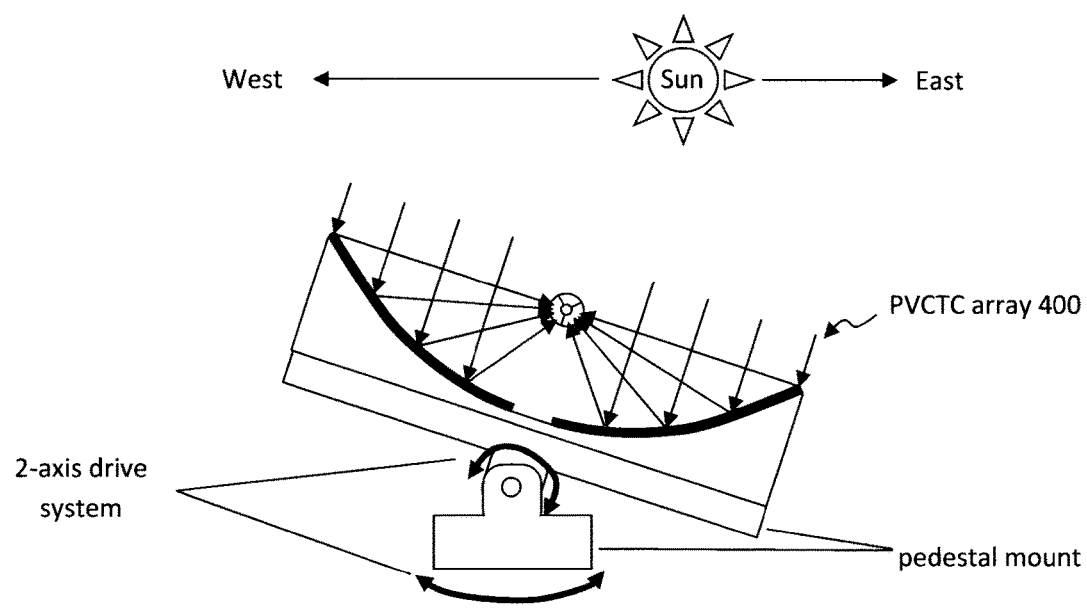
FIG. 8C is a diagram illustrating solar tracking when the sun is located in the eastern part of the sky according to an embodiment of the present invention.

In the example shown in FIGS. 8A-C, a two-axis solar tracking drive system is being used in conjunction with PVCTC array 400. As shown in FIGS. 8A-C, the solar tracking drive system includes a pedestal mount that permits the PVCTC array 400 (shown in side-view) to rotate along two different axes. Thus, using these solar tracking capabilities, the PVCTC array 400 can be pointed in two dimensions to follow movement of the sun.

According to an exemplary embodiment, the two-axis drive system shown in FIGS. 8A-C is equipped with motorized actuators (not shown) to permit automated (e.g., remote, computer-controlled) adjustment of the positioning. The process for implementing such motorized actuators in accordance with the present teachings would be apparent to one of ordinary skill in the art and thus is not described further herein.

Figure 9:
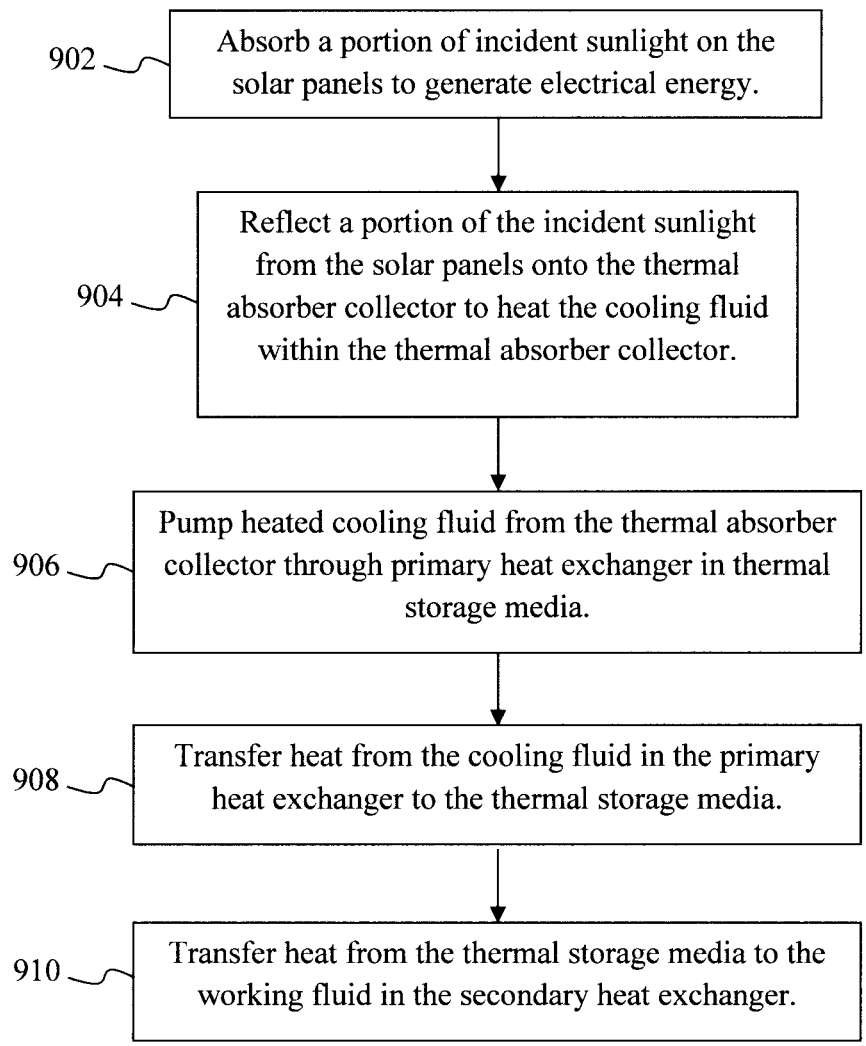
FIG. 9 is a diagram illustrating an exemplary methodology for hybrid electrical and thermal energy production using the thermal fluid circulation and storage system of FIG. 5 having at least one PVCTC array according to an embodiment of the present invention.

FIG. 9 provides an illustrative example of a methodology 900 for hybrid electrical and thermal energy production using, e.g., the thermal fluid circulation and storage system 500 of FIG. 5 having at least one PVCTC array 400. In step 902, during operation, a portion of sunlight incident on the solar panels 102 is absorbed to generate electrical energy. A portion of the incident light is also reflected by the solar panels, in step 904, onto the thermal absorber collector 104, heating the cooling fluid within the thermal absorber collector 104.

In step 906, the cooling fluid (now heated) is pumped (via fluid pump 502) from the thermal absorber collector 104 through the primary heat exchanger 504. In step 908, heat from the cooling fluid is transferred from in the primary heat exchanger 504 to the thermal storage media 508 in tank 506. In step 910, the heat from the thermal storage media 508 is then transferred to the working fluid in the secondary heat exchanger 510.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A photovoltaic concentrating thermal collector (PVCTC), comprising:
    a thermal absorber collector; and
    parabolically-bent solar panels forming a parabolic shaped trough reflector partially surrounding the thermal absorber collector so as to reflect incident light onto the thermal absorber collector, wherein each of the parabolically-bent solar panels comprises multiple solar cells.

2. The PVCTC of claim 1, wherein the thermal absorber collector comprises an evacuated thermal absorber collector.

3. The PVCTC of claim 1, wherein the thermal absorber collector comprises a thermal absorber heat exchanger.

4. The PVCTC of claim 1, wherein the parabolically-bent solar panels comprise crystalline silicon photovoltaic panels.

5. The PVCTC of claim 1, wherein the parabolically-bent solar panels are glazed with an optical coating selected from the group consisting of: magnesium fluoride, zinc sulfide, silicon dioxide, titanium oxide, and combinations thereof.

6. The PVCTC of claim 1, further comprising:
    a trough shaped frame, wherein the parabolically-bent solar panels are mounted to the trough shaped frame such that the trough shaped frame imparts strain in the parabolically-bent solar panels to form the parabolic shaped trough reflector.

7. The PVCTC of claim 6, wherein the parabolically-bent solar panels are mounted to the trough shaped frame using an adhesive.

8. The PVCTC of claim 1, further comprising:
    a solar tracking system configured to point the parabolically-bent solar panels normal to the sun.

9. The PVCTC of claim 2, further comprising:
    a cooling fluid within the evacuated thermal absorber collector.

10. The PVCTC of claim 9, wherein the cooling fluid is selected from the group consisting of: water, oil, polyethylene glycol, Perfluoropolyether oil, and combinations thereof.

11. A PVCTC system, comprising:
    an array of PVCTC units, wherein each of the PVCTC units comprises:
        a thermal absorber collector; and
        parabolically-bent solar panels forming a parabolic shaped trough reflector partially surrounding the thermal absorber collector so as to reflect incident light onto the thermal absorber collector, wherein each of the parabolically-bent solar panels comprises multiple solar cells, and wherein an array of the PVCTC units is present along a length of the thermal absorber collector.

12. The PVCTC system of claim 11, further comprising:
    a cooling fluid; and
    a pump for pumping the cooling fluid through the thermal absorber collector.

13. The PVCTC system of claim 12, wherein the cooling fluid is selected from the group consisting of: water, oil, polyethylene glycol, Perfluoropolyether oil, and combinations thereof.

14. The PVCTC system of claim 12, further comprising:
    a thermal storage media tank containing a thermal storage media; and
    a primary heat exchanger, within the thermal storage media tank and in contact with the thermal storage media, fluidly connected to the thermal absorber collector.

15. The PVCTC system of claim 11, further comprising:
    a secondary heat exchanger within the thermal storage media tank and in contact with the thermal storage media, wherein the secondary heat exchanger contains a working fluid.

16. The PVCTC system of claim 11, wherein the parabolically-bent solar panels comprise crystalline silicon photovoltaic panels.

17. The PVCTC system of claim 11, wherein the parabolically-bent solar panels are glazed with an optical coating selected from the group consisting of: magnesium fluoride, zinc sulfide, silicon dioxide, titanium oxide, and combinations thereof.

18. The PVCTC system of claim 11, wherein each of the PVCTC units further comprises:
   a trough shaped frame, wherein the parabolically-bent solar panels are mounted to the trough shaped frame such that the trough shaped frame imparts strain in the parabolically-bent solar panels to form the parabolic shaped trough reflector.

19. The PVCTC system of claim 18, wherein the parabolically-bent solar panels are mounted to the trough shaped frame using an adhesive.

20. The PVCTC system of claim 11, further comprising:
   a solar tracking system configured to point the parabolically-bent solar panels normal to the sun.

* * * * *